United States Patent [19]

Dyce et al.

[11] 4,447,100

[45] May 8, 1984

[54] APPARATUS FOR GROUNDING AND TERMINATING A CABLE

[75] Inventors: John W. Dyce; Edwin R. Waters, both of Sidney; Cy E. Sherwood, Bainbridge, all of N.Y.

[73] Assignee: The Bendix Corporation, Southfield, Mich.

[21] Appl. No.: 383,889

[22] Filed: Jun. 1, 1982

[51] Int. Cl.[3] ........................ H01R 4/66; H01R 13/46; H01R 13/58; H02G 15/06

[52] U.S. Cl. ...................................... 339/14 R; 29/862; 174/75 C; 174/89; 339/103 M; 339/143 R

[58] Field of Search ........... 339/143 R, 177 R, 177 E, 339/14 R, 103 M; 29/862; 174/35 C, 75 C, 88 C, 89

[56] References Cited

U.S. PATENT DOCUMENTS 3,136,843 6/1964 Pomerantz et al. ........ 339/177 R X
3,391,381 7/1968 Livingston ...................... 339/143 R
3,509,513 4/1970 Russin ............................... 339/14 R
3,646,496 2/1972 Williams ........................... 339/14 R
3,879,102 4/1975 Horak ............................. 339/143 R
3,985,418 10/1976 Spinner ........................... 339/177 R
3,990,765 11/1976 Hill ................................. 339/177 R
4,126,372 11/1978 Hashimoto et al. ............ 339/177 E

FOREIGN PATENT DOCUMENTS 2556820 6/1977 Fed. Rep. of Germany .... 174/35 C

*Primary Examiner*—John McQuade
*Assistant Examiner*—Steven C. Bishop
*Attorney, Agent, or Firm*—Raymond J. Eifler; Charles D. Lacina

[57] ABSTRACT

A shielded electrical cable (5) is secured and grounded to a connector housing (60, 63) by placing a ferrule (50) around a portion of the cable (5), connecting the shields (10, 20) together and captivating the ferrule between two plates (71, 72) which are secured within the connecting housing (60, 63).

3 Claims, 7 Drawing Figures

APPARATUS FOR GROUNDING AND TERMINATING A CABLE

This invention relates to an electrical connector and more particularly to the grounding of shielded cables entering the connector.

To avoid spurious signal i.e., noise in some electrical circuitry it is necessary to have one or more grounded metal shields surrounding the conductor associated with the circuitry. A grounded metal shield picks up signals via lightning or other circuitry and conducts them to ground thereby preventing them from affecting the conductor within the shields. It is a requirement in some applications that the shielded cable not require special tools for field repair, and allow removal and/or repair of individual component cables from the connector, and provide electrical grounding of the shields. In addition to this, the cable should be provided with some type of strain relief to prevent an axial force on the cable from disrupting the cable connections within the connector housing.

DISCLOSURE OF THE INVENTION

This invention provides a method and apparatus that combines the grounding and strain relief functions in a cable and connector assembly.

The invention is characterized by a ferrule which is electrically connected to the inner and outer metal shields of the cable and then secured within a connector housing by two plates that captivate the ferrule between them.

One advantage of the invention is that it combines the electrical grounding and strain relief function in a cable and connector assembly in a simple and economical way.

Another advantage of the invention is that it does not require special tools for repairing or replacing the cable termination within an electrical connector.

Another advantage of the invention is that it eliminates the need for a separate strain relief apparatus attached between the cable and connector housing.

DETAILED DESCRIPTION OF THE INVENTION

Figure 1:
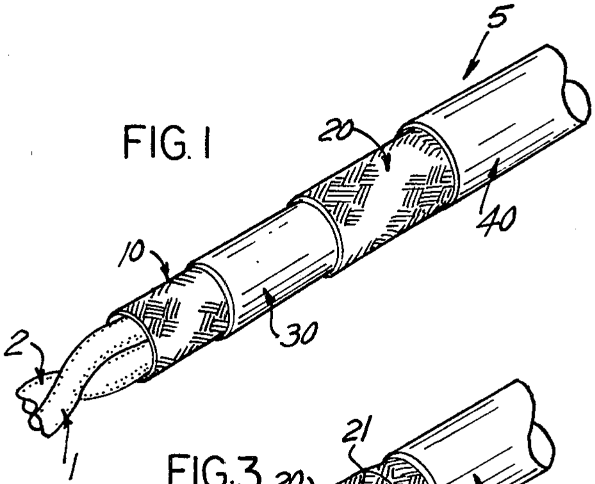
FIG. 1 illustrates an electrical cable.

Referring now to the drawings, FIG. 1 illustrates an electrical cable 5 of the type having a plurality of wires 1, 2 surrounded by an inner braided metal shield 10 and an outer braided metal shield 20; an inner jacket 30 of dielectric material between the shields 10, 20; and an outer jacket 40 of dielectric material surrounding the outer metal shield 20. Cable 5 is shown with the material from the inner and outer jackets 30, 40 stripped away to expose a portion of the inner and outer shields. Wires 1 and 2 are of the type having a central conductor surrounded by a dielectric material.

Figure 2:
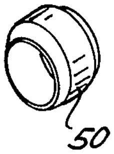
FIG. 2 illustrates a ferrule to be placed around the cable.

FIG. 2 illustrates a ring shaped ferrule 50 through which a portion of cable 5 may pass. The ferrule 50 may also take a C shaped configuration so that it may be snapped onto a cable.

Figure 3:
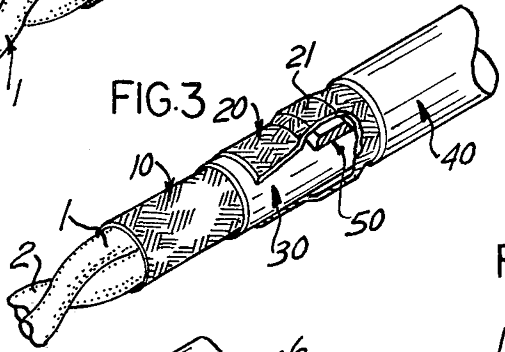
FIG. 3 illustrates a ferrule mounted on the cable.

FIG. 3 illustrates the ferrule 50 located between the outer shield 20 and the inner jacket 30.

Figure 4:
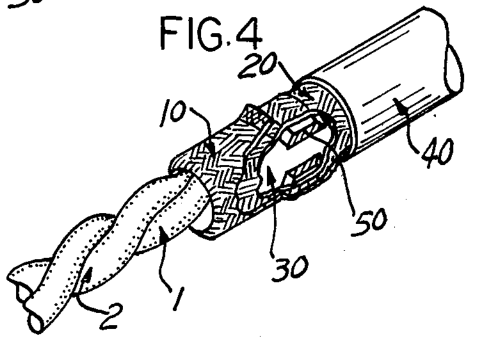
FIG. 4 illustrates the electrical connection of the two shields of a cable.

FIG. 4 illustrates how the inner shield 10 is folded back over the inner jacket 30 and over a portion of the exposed outer shield 20 to electrically connect the inner 10 and outer 20 shields together.

Figure 5:
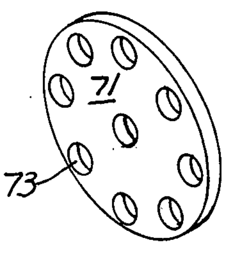
FIG. 5 illustrates a plate having apertures for receiving one or more cables.

FIG. 5 illustrates a plate 7 having a plurality of apertures 73 therein, each of which are adapted to receive an electrical cable 5.

Figure 6:
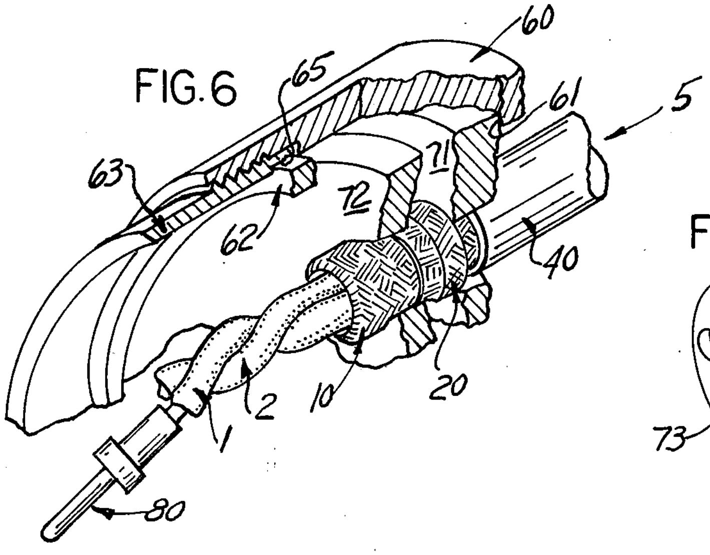
FIG. 6 illustrates a portion of an electrical connector assembly incorporating the principles of this invention.

FIG. 6 illustrates how the cable 5 is electrically grounded and secured to a connector assembly. To illustrate the invention a portion of the connector assembly, i.e., the retainer nut 60 and a portion of the back shell 63 are shown. Cable 5 is grounded and secured to the connector 60, 63 by captivating the ferrule (50) beneath the shield 20 between two plates 71, 72. The plates 71, 72 are secured within the connector by a retainer ring 62 which abuts against one of the plates 72 and mates with a groove 65 in the housing. The other plate 71 abuts against a shoulder 61 within the connector retaining nut 60. The wires 1, 2 are connected to respective contacts 80.

From the drawings it can be seen that the method of grounding and terminating the cable 5 is easily accomplished by stripping material from the inner and outer jackets 30, 40 to expose a portion of the inner and outer shields 10, 20; placing the ferrule 50 between the outer shield 20 and the inner jacket 30; folding the inner shield 10 back over the inner jacket 30 and over a portion of the exposed outer shield 20; and securing the ferrule 50 within the connector housing 60, 63 by locating a metal plate 71, 72 one each side of the ferrule 50 and captivating the plate within the connector housing by the shoulder 61 and retainer ring 62.

Figure 7:
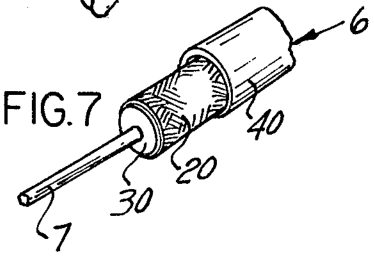
FIG. 7 illustrates a coaxial type cable that may be used in conjunction with the invention.

FIG. 7 illustrates a coaxial cable 6 that may be terminated in a connector housing in the same manner as the cable 5 having two braided shields 10, 20. The coaxial cable includes a center conductor 7 surrounded by an inner jacket 30 of dielectric material, a braided metal shield, and an outer jacket 40 of dielectric material. To terminate the cable 6, the ring 50 would be placed under the braided metal shield 20 and then the plates (FIG. 6) 72, 71 would be used to captivate the cable 6 within a connector assembly.

While a preferred embodiment of this invention has been disclosed, it will be apparent to those skilled in the art that changes may be made to the invention as set forth in the appended claims, and in some instances, certain features of the invention may be used to advantage without corresponding use of other features. For example, the ferrule 50 may be comprised of metal or plastic and the plates 71 may be comprised of metal to electrically ground each of the cables 5 together. Accordingly, it is intended that the illustrative and descriptive materials herein be used to illustrate the principles of the inventions and not to limit the scope thereof.

Having described the invention, what is claimed is:

1. In combination with an electrical connector of the type having a housing; a plurality of cables extending into said housing, each of said cables having at least one wire therein surrounded by an inner and outer metal shield, an inner jacket of dielectric material between the shields and an outer jacket of dielectric material surrounding the outer shield; means for electrically grounding the inner and outer shield of said cables together and securing said cables within said connector housing; and contacts attached to the end of each wire and mounted within said connector housing, the improvement wherein said means for grounding said cable shields and securing said cables comprises:

a first plate having a plurality of apertures therein with each of said cables extending through a respective aperture;

a plurality of ferrules, each ferrule located around a respective cable and in contact with its outer shield, said inner shield of each cable folded back over its respective inner jacket and outer shield in close proximity to said ferrule, one side of said ferrule located adjacent said first plate;

a second plate having a plurality of apertures therein with each of said cables extending through a respective aperture, one face of said second plate located adjacent the other side of said ferrule; and means for securing said plates within said connector housing whereby the ferrules of each of said cables are captivated within the housing to provide a strain relief for an axial force applied to said cable.

2. The combination as recited in claim 1 wherein each of said plates are electricaly conductive whereby the shields of each of said cables are electrically grounded together.

3. The combination as recited in claim 1 or 2 wherein a ferrule is located between the outer metal shield and inner jacket of each cable.

* * * * *